United States Patent [19]

Dehennau et al.

[11] Patent Number: 5,096,782
[45] Date of Patent: Mar. 17, 1992

[54] STRUCTURES WITH MULTIPLE POLYMERIC LAYERS COMPRISING A VINYLIDENE FLUORIDE POLYMER LAYER BONDED TO A POLAR POLYMER LAYER

[75] Inventors: Claude Dehennau, Waterloo; Serge Dupont, Vilvoorde, both of Belgium

[73] Assignee: Solvay & Cie, Brussels, Belgium

[21] Appl. No.: 527,331

[22] Filed: Apr. 26, 1990

[30] Foreign Application Priority Data

May 5, 1989 [FR] France .............................. 89 06086

[51] Int. Cl.$^5$ .............................................. B32B 27/08
[52] U.S. Cl. ...................................... 428/412; 428/421; 428/516; 428/519; 428/520
[58] Field of Search ............... 428/421, 516, 519, 520, 428/518, 412

[56] References Cited

U.S. PATENT DOCUMENTS

| | | | |
|---|---|---|---|
| 3,524,795 | 8/1970 | Peterson | 156/244.11 X |
| 4,585,694 | 4/1986 | Dehennau | 428/421 X |
| 4,659,625 | 4/1987 | Decroly et al. | 428/421 |

FOREIGN PATENT DOCUMENTS

| | | | |
|---|---|---|---|
| 1484153 | 6/1967 | France | 428/421 |
| 2071007 | 9/1981 | United Kingdom | 428/421 |

*Primary Examiner*—Thomas J. Herbert, Jr.
*Attorney, Agent, or Firm*—Spencer & Frank

[57] ABSTRACT

Structures with multiple polymeric layers comprising a vinylidene fluoride polymer layer bonded to a polar polymer layer by the use of a polymeric adhesive comprising a vinyl acetate polymer. These structures are characterized in that the product of the weight content of vinyl acetate of the polymeric adhesive, expressed in percent, and its dynamic viscosity at 100° C. and 1 s$^{-1}$, expressed in kPa s, is greater than $1.4 \times 10^3$. The structures with multiple polymeric layers can take the form of films, sheets, panels, tubes or hollow bodies which can be employed particularly in the field of protection against corrosion or ultraviolet rays.

12 Claims, No Drawings

STRUCTURES WITH MULTIPLE POLYMERIC LAYERS COMPRISING A VINYLIDENE FLUORIDE POLYMER LAYER BONDED TO A POLAR POLYMER LAYER

The present invention relates to structures with multiple polymeric layers comprising a vinylidene fluoride polymer layer bonded to a polar polymer layer and more particularly such multilayer structures in which the vinylidene fluoride polymer is bonded to the polar polymer by the use of a polymeric adhesive comprising a vinyl acetate polymer.

Vinylidene fluoride polymers are thermoplastic polymers which exhibit a combination of advantageous properties and, in particular, a high chemical inertness and an excellent resistance to inclement weather and to ultraviolet rays. As a result, they find multiple applications in very diverse fields and, in particular, in protection against corrosion or ultraviolet rays.

Nevertheless, they present the disadvantage of being relatively costly, and this runs the risk of limiting their outlets. An appropriate means for reducing the cost of objects made of vinylidene fluoride polymer consists in employing these polymers in the form of structures with multiple polymeric layers (films, sheets, panels, tubes, hollow bodies, and the like) in which they are associated with other polymers which, furthermore, contribute their own properties and advantages such as, for example, mechanical strength, sealability, imperviousness, scratch resistance, and the like. However, the abovementioned fluoropolymers adhere very poorly to other polymers, with the result that it is generally necessary to resort to adhesives, which are in most cases polymeric, to ensure an adherent bond between these fluoropolymers and other polymers.

In French Patent FR-A-1,484,153 (The Dow Chemical Co.), it is recommended to bond a polyolefin layer to a layer of fluorinated hydrocarbon polymer by the use of a polymeric adhesive consisting of a copolymer of ethylene and vinyl acetate containing from approximately 13 to 35% by weight of vinyl acetate. The use of such copolymers to bond a vinylidene fluoride polymer to a polar polymer provides multilayer composites which are sensitive to delamination.

Patent Application FR-A-84/06,372, published under number 2,563,156 (Solvay & Cie) describes structures in which a vinylidene fluoride polymer layer is bonded to a polar polymer layer by the use of a polymeric adhesive consisting of a vinyl acetate polymer. Although vinyl acetate polymers form excellent adhesives at room temperature, it has been found that the delamination resistance of some of them decreases greatly with a rise in temperature, and this limits their outlets to fields where a high delamination resistance when hot is not required.

The present invention aims to provide improved polymeric adhesives comprising vinyl acetate polymers, which provide a clearly improved delamination resistance when hot.

To this end, the invention provides structures with multiple polymeric layers comprising a vinylidene fluoride polymer layer bonded to a polar polymer layer by means of a polymeric adhesive comprising a vinyl acetate polymer, which are characterized in that the product of the weight content of vinyl acetate of the polymeric adhesive, expressed in per cent, and its dynamic viscosity at 100° C. and 1 s$^{-1}$, expressed in kPa s, is greater than $1.4 \times 10^3$.

Structures with multiple polymeric layers comprising a vinylidene fluoride polymer layer bonded to a polar polymer layer are intended to denote multilayer structures containing at least one vinylidene fluoride polymer layer bonded to at least one polar polymer layer, it being possible for these layers to be bonded to layers of other polymers.

The invention consists, therefore, essentially in resorting to a polymeric adhesive comprising a vinyl acetate polymer such as defined above to bond a vinylidene fluoride polymer layer and make it adhere to a polar polymer layer in the production of multilayer structures. The use of such polymeric adhesives permits the manufacture of structures with multiple polymeric layers whose adhesiveness, measured by means of the peeling strength, is generally higher than 8 N/cm at room temperature and higher than 1 N/cm at 80° C.

Still better results are obtained when the product of the weight content of vinyl acetate of the polymeric adhesive, expressed in per cent, and its dynamic viscosity at 100° C. and 1 s$^{-1}$ is greater than $1.6 \times 10^3$. In this case, the peeling strength is generally higher than 10 N/cm at room temperature and higher than 2 N/cm at 80° C. The use of these latter adhesives, therefore, constitutes a preferred embodiment of the invention.

A vinyl acetate polymer is intended to denote both the homopolymer and the binary copolymers of vinyl acetate and ethylene containing at least 50% by weight of vinyl acetate. The best results are obtained with binary copolymers of vinyl acetate and ethylene containing from 60 to 90% by weight of vinyl acetate and, still more particularly, with those containing from 70 to 85% by weight of vinyl acetate, which are consequently preferred.

Vinyl acetate polymers, homopolymers and copolymers with ethylene, are polymers which are well known per se. They can be manufactured by all the usual techniques of polymerization of ethylenically unsaturated monomers. They are usually manufactured by polymerization in aqueous emulsion.

The vinyl acetate polymers such as defined above are more or less adhesive polymers and, as a result, are difficult to use and can give rise to blocking phenomena. In order to counter this disadvantage, it is advantageous to employ a vinyl acetate polymer coated with a thermoplastic polymer. According to a particularly preferred embodiment of the invention, a vinyl acetate polymer coated with a thermoplastic polymer is therefore employed. By way of examples of such thermoplastic polymers, there may be mentioned vinyl or vinylidene fluoride polymers and vinyl chloride polymers. A thermoplastic coating polymer which is very particularly preferred is polyvinyl chloride. The thermoplastic coating polymer is generally present in a proportion of at most approximately 10% by weight of the coated acetate polymer.

The coating of the vinyl acetate polymer with a thermoplastic polymer can be carried out, for example, by the addition of a thermoplastic polymer latex to a latex of vinyl acetate polymer and coagulation of the whole, for example by the addition of an electrolyte.

According to a particularly preferred embodiment of the present invention, the polymeric adhesive employed is a mixture of vinyl acetate polymer and of polymethyl methacrylate. The incorporation of polymethyl methacrylate in the vinyl acetate polymer not only reduces the adhesive tendency of the latter, but also markedly improves the heat stability of the adhesive without any untoward effect on its delamination resistance when hot, provided that its polymethyl methacrylate content does not exceed 50% by weight. The polymeric adhesive according to the invention may therefore contain up to 50% by weight of polymethyl methacrylate. The quantity of polymethyl methacrylate preferably does not exceed 25% by weight. The polymer adhesives according to the invention preferably contain, therefore, at least 75% by weight of vinyl acetate polymer, the remainder consisting of polymethyl methacrylate. It is to be understood that in the case of the use of such mixtures the vinyl acetate content and the dynamic viscosity of the polymer adhesive refer to the mixture of the said adhesive polymers.

Polymeric adhesives which are very particularly preferred according to the present invention consist, therefore, of mixtures of binary copolymers of vinyl acetate and ethylene, containing from 60 to 90% by weight of vinyl acetate and of polymethyl methacrylate, the said mixture containing at least 75% by weight of vinyl acetate copolymer and, preferably, from 75 to 90% by weight of binary copolymer of vinyl acetate and ethylene.

Vinylidene fluoride polymer is intended to denote all the polymers containing at least 85 mol % and preferably at least 90 mol % of monomeric units derived from vinylidene fluoride. Vinylidene fluoride polymers which are suitable for the production of the multilayer structures according to the invention include, therefore, both vinylidene fluoride homopolymers and vinylidene fluoride copolymers containing monomeric units derived from one or more comonomers. Preference is given to polymers containing at least 90 mol % of monomeric units derived from vinylidene fluoride, the optional remainder preferably consisting of monomeric units derived from other fluoroolefins such as vinyl fluoride, trifluoroethylene, chlorotrifluoroethylene, tetrafluoroethylene and hexafluoropropylene. A fluoropolymer which is particularly preferred is vinylidene fluoride homopolymer.

A polar polymer is intended to denote thermoplastic, elastomeric and heat-curable polymers resulting from polymerization by polyaddition or polycondensation, which have a permanent dipole moment or, in other words, which contain dipolar groups in their molecule. By way of examples of such polar polymers there may be mentioned halogenated polymers such as vinyl chloride, vinylidene chloride and vinyl bromide polymers (homo- and copolymers), polymers containing nitrile functional groups, such as polyacrylonitrile and acrylonitrile/styrene copolymers or acrylonitrile/butadiene/styrene (ABS) copolymers, cellulose-based polymers, polyketones, both aliphatic and aromatic polyesters such as polymethyl or polyethyl acrylates and methacrylates and polyethylene terephthalate, vinyl alcohol/ethylene copolymers (that is t say vinyl acetate/ethylene copolymers in which at least 90% of the acetate groups have been converted into hydroxyl groups by hydrolysis or alcoholysis), aromatic polycarbonates, polyamides or nylons, and polyurethanes which, furthermore, are all well-known polymers.

Preferred polar polymers are rigid or flexible (that is to say plasticized) polyvinyl chloride, acrylonitrile/butadiene/styrene (ABS) copolymers, vinylidene chloride copolymers, vinyl alcohol/ethylene copolymers, polyethylene terephthalate, polymethyl methacrylate, aromatic polycarbonates, such as those derived from bisphenol A, nylons 6 and 66 and polyurethanes.

Polar polymers which are particularly preferred are polyvinyl chloride (rigid or flexible), acrylonitrile/butadiene/styrene (ABS) copolymers and aromatic polycarbonates. A polar polymer which is very particularly preferred is flexible polyvinyl chloride.

Flexible polyvinyl chloride is intended to denote polyvinyl chlorides whose Shore A hardness, measured according to ASTM Standard D2240, does not exceed 90. As examples of such flexible polymers there may be mentioned polyvinyl chlorides containing approximately 35 to 75 parts by weight of plasticizer and, preferably, at least 40 parts by weight of plasticizer per 100 parts by weight of vinyl chloride polymer.

It is obvious that each of the constituent polymers of the multilayer structures according to the invention may contain the usual additives employed in the processing of this polymer, such as, for example, lubricants, plasticizers, heat stabilizers, light stabilizers, particulate or fibrous fillers, pigments, and the like. It is particularly advantageous to incorporate a stabilizer against ultraviolet rays in the vinylidene fluoride polymer or in the polymeric adhesive, in order to protect the polar polymer. Similarly, it may be advantageous to incorporate a small quantity, for example up to approximately 10% by weight, of adhesive polymers in the constituent polymers of the multilayer structures.

The way in which the multilayer structures according to the invention are obtained is not critical. All the usual techniques for assembling polymeric layers to produce the multilayer structures according to the invention may therefore be utilized. An example of such a technique which may be mentioned is thermal bonding with the aid of a solution of polymeric adhesive in an appropriate solvent or mixture of solvents. Solvents which are suitable for this assembly technique are, for example, aromatic hydrocarbons such as toluene, chlorinated hydrocarbons such as methylene chloride, ketones such as acetone and methyl ethyl ketone, ethers such as tetrahydrofuran and esters such as ethyl acetate, and their mixtures. Nevertheless, preference is given to tetrahydrofuran. In practice, thermal bonding with the aid of a solution of the polymeric adhesive is carried out cold by coating a film, a sheet or a panel of vinylidene fluoride polymer (or of polar polymer) by means of a solution of the polymeric adhesive, for example with the aid of a doctor blade, drying the coating and pressing the coated (precoated) film, sheet or panel with heating onto a film, a sheet or a panel of polar polymer (or of vinylidene fluoride polymer).

The optimum temperature and duration of thermal-bonding will be evaluated by experiments in each individual case. They depend, in particular, on the nature of the polar polymer, on the thickness of the polymeric layers which are assembled and on the processing additives which are optionally incorporated in the various polymers.

Other conventional techniques for assembling polymeric layers and suitable for producing the multilayer structures according to the invention are those in which the constituent polymers are processed at a temperature which is at least equal to their softening temperature, such as heat-lamination (pressing with heating polymeric layers preformed, for example, by extrusion), coextrusion and coextrusion-doubling.

One or other of these assembly techniques will be chosen as a function of the properties, especially thermal properties, of the polar polymer which it is desired to bond to the vinylidene fluoride polymer.

Structures with multiple polymeric layers to which preference is given are those resulting from an assembly by thermal bonding or by heat-lamination, by coextrusion or by coextrusion-doubling and which comprise three layers, in the present case and in this order, a layer of vinylidene fluoride polymer, a layer of polymeric adhesive according to the invention and a layer of polar polymer, the latter being preferably chosen from polyvinyl chloride (flexible or rigid), acrylonitrile-/butadiene/styrene (ABS) copolymers and aromatic polycarbonates.

The thickness of the constituent polymeric layers of the multilayer structures according to the invention and the total thickness of the said structures are not critical and depend, of course, on the use for which they are intended. The structures with multiple polymeric layers according to the invention may therefore take the form of films, sheets, panels, tubes, hollow bodies, and the like.

The structures with multiple polymeric layers according to the invention may be advantageously employed, in the form of films, sheets, panels, tubes or hollow bodies, in fields of application requiring a high chemical inertness, such as in the chemical, pharmaceutical and food processing industries, or a high resistance to ultraviolet rays, such as, for example, in the manufacture of agricultural or greenhouse films. Practical, non-limiting uses of multilayer composites according to the invention which may be mentioned by way of examples are corrosion-resistant multilayer tubes comprising a rigid polyvinyl chloride layer, multilayer films and sheets for agriculture, comprising a flexible or rigid polyvinyl chloride or polymethyl methacrylate layer, multilayer tarpaulins and sails comprising a polyurethane or polyethylene terephthalate layer and panels comprising an ABS layer in which the layers consisting of the abovementioned polar polymers are bonded to a vinylidene fluoride polymer layer by the use of a polymeric adhesive according to the invention.

The examples which follow illustrate the invention without, however, limiting it.

Examples 1 to 4 and 7 to 10, according to the invention, and Examples 5 and 6, for comparison, all relate to multilayer structures obtained by thermal bonding of a polyvinylidene fluoride film, 125 μm in thickness, to a flexible polyvinyl chloride sheet 1.5 mm in thickness, obtained by processing a composition containing 68 parts of diisodecyl phthalate per 100 parts by weight of polyvinyl chloride.

Examples 11, 13, 15, 17, 18, 19 and 21, according to the invention, and Examples 12, 14, 16, 20 and 22, for comparison, relate to multilayer structures obtained by thermal bonding of a polyvinylidene fluoride film, 125 μm in thickness, to films, sheets or panels, depending on the thickness, of various polar polymers whose nature is given in Table I, appended. This same table also shows the thickness of the polar polymer layers.

In Examples 1, 6 and 7 the polymeric adhesive employed consists of a binary copolymer of vinyl acetate and ethylene. In Examples 2 to 5, 8 to 10 and 11 to 22, the polymeric adhesive employed consists of a mixture of binary copolymer of vinyl acetate and ethylene and of polymethyl methacrylate. The weight ratio of the vinyl acetate copolymer to the polymethyl methacrylate appears in Table II, appended (PVAC/PMMA).

In Examples 1 to 5, 11, 13, 15, 17, 18, 19, 21 and 22 the vinyl acetate polymer employed is a binary copolymer of vinyl acetate and ethylene containing 82% by weight of vinyl acetate and exhibiting a melt index (MI) of 1.65 at 170° C. under a 10 kg load. In Examples 6, 12, 14, 16 and 20 the polymer is a copolymer containing 68% by weight of vinyl acetate, exhibiting a melt index of 89 under the same conditions. Finally, in Examples 7 to 10, the polymer is a copolymer containing 69% by weight of vinyl acetate, whose melt index at 170° C. under a 10 kg load is 1.9. In all the examples, the polymethyl methacrylate employed has a melt index of 35, measured at 210° C. under a 10 kg load.

The composition of the polymeric adhesives employed in Examples 1 to 22, in particular their weight content of vinyl acetate [VAC] and their dynamic viscosity at 100° C. and 1 s$^{-1}$ [η], and the product [VAC]×[η] appears in Table II, appended.

The dynamic viscosity of the polymeric adhesives is evaluated in a rheometer which allows the mechanical and dynamic properties of the polymers to be measured from the glassy or crystalline state to the molten state. The measurements are made on tablets from 1 to 2 mm in thickness and 2.5 cm in diameter, cut from samples prepared from solutions containing 15-20% by weight of the polymeric adhesives in tetrahydrofuran.

After evaporation of the tetrahydrofuran for 48 hours at room temperature the polymeric residue is heated to 100° C. for 2 minutes and is then pressed for 2 minutes at 100° C. under a pressure of 80 bars. The pressed sample is then cooled under a pressure of 80 bars to room temperature, after which it is cut into tablets.

The measurement consists in determining the moduli G' and G" at a frequency $v$ of 0.16 cycles per second, that is to say at a velocity gradient of 1 s$^{-1}$ and at a temperature of 100° C. The dynamic viscosity at 100° C. and 1 s$^{-1}$ is then calculated using the following formula:

$$\eta = \frac{\sqrt{G'^2 + G''^2}}{2 \pi v}$$

The polyvinylidene fluoride film is coated with a solution of polymeric adhesive at a concentration of 20% by weight of tetrahydrofuran, with the aid of a 200-μm wire spreader, and the coating is dried for 3 minutes in an oven controlled at 80° C. The thickness of the dry coating is 30 μm. The precoated polyvinylidene fluoride film is pressed with heating onto a flexible polyvinyl chloride layer for 1.30 minutes and under a pressure of 30 bars in a Lafarge press kept at 140° C., and the composite is then transferred to a cold press and is kept in it under the same pressure for 8 minutes at room temperature.

The results of the evaluation of adhesiveness, measured by means of the peeling strength of the multilayer structures according to Examples 1 to 22 are given in Table II, appended. The peeling strength is measured in a Frank model 650 tensometer according to a method based on the ASTM Standard D 1876-72. Before the measurement the samples are conditioned for 24 hours in a constant-temperature room at 23° C. (adhesiveness at 23° C.), or for 20 minutes in a ventilated oven at 80° C. (adhesiveness at 80° C.).

Comparison of the results of the examples according to the invention with those of the comparison examples shows the appreciable superiority of the polymeric adhesives according to the present invention, most particularly in respect of the adhesiveness when hot, over polymeric adhesives of the same composition or of similar composition, but which do not conform to the claim (product $[VAC \times \eta] < 1.4 \times 10^3$). More particularly, the results of Examples 1 and 7 according to the invention should be compared with those of Example 6, for comparison, and those of Examples 2 to 4, according to the invention, with those of Example 5, for comparison.

TABLE I

| Example No. | Nature of the polar polymer | Thickness of the polar polymer layer |
|---|---|---|
| 11 | Thermoplastic polyurethane elastomer | 600 μm |
| 12 | Thermoplastic polyurethane elastomer | 600 μm |
| 13 | Rigid polyvinyl chloride | 2 mm |
| 14 | Rigid polyvinyl chloride | 2 mm |
| 15 | Aromatic polycarbonate derived from bisphenol A | 2 mm |
| 16 | Aromatic polycarbonate derived from bisphenol A | 2 mm |
| 17 | Polymethyl methacrylate | 2 mm |
| 18 | Copolymer of vinylidene chloride and vinyl chloride | 145 μm |
| 19 | Copolymer of vinylidene chloride and vinyl chloride | 145 μm |
| 20 | Copolymer of vinylidene chloride and vinyl chloride | 145 μm |
| 21 | ABS copolymer | 2 mm |
| 22 | ABS copolymer | 2 mm |

TABLE II

| Example No. | Composition of the polymeric adhesive | | | | Adhesiveness, newton/cm | |
|---|---|---|---|---|---|---|
| | Weight proportion PVAC/PMMA | [VAC], % by weight | η, KPa s | [VAC] × η | at 23° C. | at 80° C. |
| 1 | 100/0 | 82 | 24 | 1968 | 16.49 | 3.26 |
| 2 | 90/10 | 74 | 25 | 1850 | 18.72 | 2.66 |
| 3 | 75/25 | 61.5 | 29 | 1784 | 16.65 | 2.85 |
| 4 | 50/50 | 41 | 40 | 1640 | 11.96 | 2.28 |
| 5 | 25/75 | 21 | 65 | 1365 | 7.15 | 0.88 |
| 6 | 100/0 | 68 | 7.5 | 510 | 4.30 | 0.05 |
| 7 | 100/0 | 69 | 27 | 1900 | 13.72 | 4.05 |
| 8 | 90/10 | 62 | 29 | 1800 | 15.65 | 3.97 |
| 9 | 75/25 | 52 | 33 | 1730 | 14.93 | 3.70 |
| 10 | 50/50 | 34.5 | 43 | 1480 | 12.52 | 3.11 |
| 11 | 75/25 | 61.5 | 29 | 1784 | 17.20 | 4.00 |
| 12 | 90/10 | 61 | 9.5 | 580 | 4.40 | 0 |
| 13 | 75/25 | 61.5 | 29 | 1784 | 30 | 5.40 |
| 14 | 50/50 | 34 | 18 | 610 | 15 | 1.00 |
| 15 | 50/50 | 41.0 | 40 | 1640 | rupture* | 8.00 |
| 16 | 90/10 | 61.0 | 9.5 | 580 | rupture* | 1.30 |
| 17 | 90/10 | 74 | 25 | 1850 | rupture* | 5.30 |
| 18 | 90/10 | 74 | 25 | 1850 | rupture* | 4.00 |
| 19 | 50/50 | 41 | 40 | 1640 | rupture* | 4.00 |
| 20 | 50/50 | 34 | 18 | 610 | rupture* | 0.40 |
| 21 | 75/25 | 61.5 | 29 | 1784 | 16.53 | 15.07 |
| 22 | 25/75 | 21 | 65 | 1365 | 7.61 | 2.74 |

*rupture = adhesiveness greater than the strength of the film

We claim:

1. A structure with multiple polymeric layers comprising a vinylidene fluoride polymer layer bonded to a polar polymer layer by the use of a polymeric adhesive comprising a vinyl acetate polymer, which are characterized in that the product of the weight content of vinyl acetate of the polymeric adhesive, expressed in per cent, and its dynamic viscosity at 100° C. and 1 s$^{-1}$, expressed in kPa s, is greater than $1.4 \times 10^3$.

2. The structure with multiple polymeric layers according to claim 1, wherein the product of the weight content of vinyl acetate of the polymeric adhesive, expressed in per cent, and its dynamic viscosity at 100° C. and 1 s$^{-1}$, expressed in kPa s, is greater than $1.6 \times 10^3$.

3. The structure with multiple polymeric layers according to claim 1, wherein the vinyl acetate polymer is a binary copolymer of vinyl acetate and ethylene containing from 60 to 90% by weight of vinyl acetate.

4. The structure with multiple polymeric layers according to claim 1, wherein the polymeric adhesive consists of 75 to 90% by weight of binary copolymer of vinyl acetate and ethylene containing from 60 to 90% by weight of vinyl acetate and of 25 to 10% by weight of polymethyl methacrylate.

5. The structure with multiple polymeric layers according to claim 1, wherein they result from an assembly by thermal bonding with the aid of a solution of the adhesive polymer.

6. The structure with multiple polymeric layers according to claim 1, assembled by heat-lamination, or by coextrusion.

7. The structure with multiple polymeric layers according to claim 1, assembled by coextrusion-lamination.

8. The structure with multiple polymeric layers according to claim 1, wherein the polar polymer is selected from the group consisting of polyvinyl chloride, acrylonitrile/butadiene/styrene (ABS) copolymers and aromatic polycarbonates.

9. The structure with multiple polymeric layers according to claim 8, wherein the polar polymer is flexible polyvinyl chloride whose Shore A hardness does not exceed 90.

10. The structure with multiple polymeric layers according to claim 1, wherein the polymeric adhesive contains an effective amount of polymethyl methacrylate to improve the heat stability of the polymeric adhesive.

11. The structure with multiple polymeric layers according to claim 10, wherein the polymeric adhesive contains polymethyl methacrylate in a quantity not exceeding 50% by weight.

12. The structure with multiple polymeric layers according to claim 11, wherein the polymeric adhesive contains polymethyl methacrylate in a quantity not exceeding 25% by weight.

* * * * *